United States Patent [19]

Taylor

[11] Patent Number: 5,077,794
[45] Date of Patent: Dec. 31, 1991

[54] DUAL FRAMING BIT SEQUENCE ALIGNMENT APPARATUS AND METHOD

[75] Inventor: Steven C. Taylor, Hillsborough, Calif.

[73] Assignee: Verilink Corporation, San Jose, Calif.

[21] Appl. No.: 678,163

[22] Filed: Mar. 28, 1991

Related U.S. Application Data

[63] Continuation-in-part of Ser. No. 437,406, Nov. 16, 1989, abandoned.

[51] Int. Cl.[5] .......................... H04L 9/02; H04L 7/00
[52] U.S. Cl. ...................................... 380/48; 375/108; 375/109; 375/112
[58] Field of Search .................. 380/48; 375/108, 109, 375/112

[56] References Cited

U.S. PATENT DOCUMENTS

| | | | |
|---|---|---|---|
| 4,110,558 | 8/1978 | Kageyama et al. | 375/109 |
| 4,606,042 | 8/1986 | Kahn et al. | 380/48 |
| 4,760,599 | 7/1988 | Okamoto et al. | 380/48 |
| 4,817,142 | 3/1989 | van Rassel | 380/48 |

*Primary Examiner*—Stephen C. Buczinski
*Attorney, Agent, or Firm*—David B. Newman, Jr. & Associates

[57] ABSTRACT

A dual-framing-bit-alignment apparatus having a communications channel, a data device, an encryptor, a framing-bit device, a decryptor, a first framing-bit repositioner, and a second framing-bit repositioner. The first data device generates a first data-bit sequence having a first framing-bit sequence. The encryptor encrypts the first data-bit sequence as an encrypted-bit sequence. The framing-bit device substitutes on the encrypted-bit sequence, a second framing-bit sequence, thereby generating a framed-encrypted-bit sequence. The decryptor decrypts the framed-encryped-bit sequence as a second data-bit sequence. The second data-bit sequence contains errors due to the second framing-bit sequence. A second framing-bit repositioner detects in the second data-bit sequence, the first framing-bit sequence and the errors. In response to detecting the errors and the first framing-bit sequence, the first framing-bit repositioner aligns the first framing-bit sequence with the second framing-bit sequence.

20 Claims, 4 Drawing Sheets

Fig. 5

X = Restoral Offset
Y = Adjustment Offset

| D4 | ESF | Normal | | Alarmed | |
|---|---|---|---|---|---|
| | | IVT | IVS | IVT | IVS |
| Ft | M | 0 | | 0 | |
| Fs | C | | 0 | | 0 |
| Ft | M | 1 | | 0 | |
| Fs | F | | 1 | | 0 |
| Ft | M | 0 | | 0 | |
| Fs | C | | 0 | | 0 |
| Ft | M | 0 | | 1 | |
| Fs | F | | 0 | | 1 |
| Ft | M | 0 | | 0 | |
| Fs | C | | 0 | | 0 |
| Ft | M | 1 | | 0 | |
| Fs | F | | 1 | | 0 |
| Ft | M | 0 | | 0 | |
| Fs | C | | 0 | | 0 |
| Ft | M | X7 | | Y7 | |
| Fs | F | | X7 | | Y7 |
| Ft | M | 0 | | 0 | |
| Fs | C | | 0 | | 0 |
| Ft | M | X6 | | Y6 | |
| Fs | F | | X6 | | Y6 |
| Ft | M | 0 | | 0 | |
| Fs | C | | 0 | | 0 |
| Ft | M | X5 | | Y5 | |
| Fs | F | | X5 | | Y5 |
| Ft | M | 1 | | 1 | |
| Fs | C | | 1 | | 1 |
| Ft | M | X4 | | Y4 | |
| Fs | F | | X4 | | Y4 |
| Ft | M | 1 | | 1 | |
| Fs | C | | 1 | | 1 |
| Ft | M | X3 | | Y3 | |
| Fs | F | | X3 | | Y3 |
| Ft | M | 1 | | 1 | |
| Fs | C | | 1 | | 1 |
| Ft | M | X2 | | Y2 | |
| Fs | F | | X2 | | Y2 |
| Ft | M | 1 | | 1 | |
| Fs | C | | 1 | | 1 |
| Ft | M | X1 | | Y1 | |
| Fs | F | | X1 | | Y1 |
| Ft | M | 1 | | 1 | |
| Fs | C | | 1 | | 1 |
| Ft | M | X0 | | Y0 | |
| Fs | F | | X0 | | Y0 |
| Ft | M | 1 | | 1 | |
| Fs | C | | 1 | | 1 |
| Ft | M | 0 | | 0 | |
| Fs | F | | 1 | | 1 |

DUAL FRAMING BIT SEQUENCE ALIGNMENT APPARATUS AND METHOD

This is a continuation-in-part of application Ser. No. 07/437,406, filed 16 November 1989, now abandoned.

BACKGROUND OF THE INVENTION

This invention relates to secure communications, and more particularly to a method and apparatus for aligning a first framing bit sequence on a plain text signal with a second framing bit sequence on a ciphertext signal.

DESCRIPTION OF THE PRIOR ART

Figure 1:
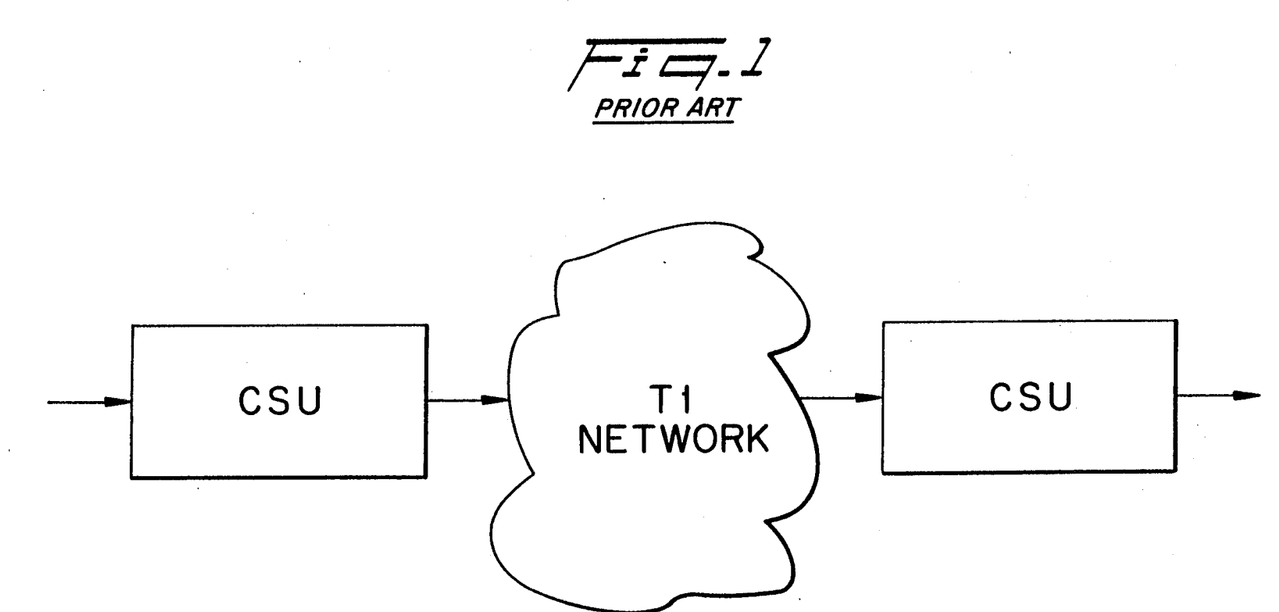
FIG. 1 is a block diagrammatic view of a channel service unit coupled to a T1 network.

The T1 Network, as shown in FIG. 1, allows the transmission of data between users at 1.544 Mbps. Because of the equipment used in the T1 network, specifications for the T1 service permit no more than fifteen consecutive 0bits to be sent serially in a data-bit sequence, without a 1-bit. Additionally, in each and every time window of $8\times(n'+1)$ bits, were n' can equal 1 through 23, there must be at least n' 1-bits present. These specifications are called the ones-bit density requirement. This requirement is necessary for keeping equipment, such as repeaters, in the network from losing synchronization. A user of the T1 network typically meets this requirement using a channel service unit (CSU) inserted between the user's equipment and the T1 network.

The specifications for data transmission through the T1 network further include having 193 bit frames, with the frame synchronization bit included as the 193rd bit. The frame synchronization bits typically are alternating 1-bits and 0bits, and cannot be altered by the channel service unit or other user interface equipment.

A problem exists in the prior art when data from a user and his modem are properly formatted for the T1 network, and are encrypted just prior to transmission over the channel. While the frame synchronization bits will appear at the receiving end in the decrypted data-bit sequence, the frame synchronization bits are not present in the T1 channel due to encryption.

The problem in the prior art with encryption is that all essential information in a data-bit sequence, including the frame synchronization bits, are scrambled or encrypted, as the data-bit sequence passes through an encryption device. Due to security requirements, it is not permissible to have a device which bypasses the encryptor or the decryptor for tracking the frame synchronization bit from the plaintext and substituting the frame synchronization bit in the ciphertext. Using such a device would be a security violation.

One prior art solution is to delete the frame synchronization bits prior to encryption, and then add one bit per frame after encryption to the encrypted bit sequence. Before the decryptor, the framing bits, one bit per frame, on the encrypted bit sequence are deleted. This prior art solution does not work. All the essential information in the data bit sequence prior to encryption are scrambled with the encryptor. After the decryptor, where are the framing bits to be inserted?

OBJECTS AND SUMMARY OF THE INVENTION

An object of the present invention is to provide a method and apparatus which will automatically track a framing-bit data sequence in ciphertext at a receiver after being deciphered by a decryption unit.

Another object of the present invention is to provide a method and apparatus which will allow tracking a first framing-bit sequence in plaintext and a second framing-bit sequence in ciphertext without tampering or bypassing an encryption or decryption unit.

A further object of the invention is to provide a method and apparatus for aligning a first framing-bit data sequence present in a first data-bit sequence from a data device, with a second framing-bit sequence present in ciphertext without the need or use of costly and complex equipment such as phase lock loops, first in first out memories and buffers, and other complex equipment.

According to the present invention, as embodied and broadly described herein, a dual-framing-bit-alignment apparatus is provided comprising a communications channel, generating means, encoding/decoding means, substituting and transmitting means, second encoding/decoding means, detecting means, and aligning means. The encoding decoding means may be embodied as a first encryptor/decryptor, the substituting means may be embodied as a framing-bit device, the second encoding/decoding means may be embodied as a second encryptor/decryptor, and the detecting means and aligning means may be embodied as a first framing-bit repositioner and a second framing-bit repositioner, respectively. The data device is coupled to the first framing-bit repositioner, and the first framing-bit repositioner is coupled to the encryptor. The first encryptor/decryptor is coupled to the framing-bit device which is coupled to the communications channel. At the receiver, the communications channel is coupled to the second encryptor/decryptor, which is coupled to the second framing-bit repositioner.

The generating means generates a first data-bit sequence having a first framing-bit sequence. The first encoding/decoding means encodes the first data-bit sequence as an encoded-bit sequence. The substituting means substitutes on the encoded-bit sequence, a second framing-bit sequence, thereby generating a framed-encoded-bit sequence. The transmitting means transmits the framed-encoded-bit sequence with the second framing-bit sequence over the communications channel. The second encoding/decoding means decodes the framed encoded-bit sequence as a second data-bit sequence. The second data-bit sequence contains errors due to the second framing-bit sequence, which was substituted on the encoded-bit sequence.

The detecting means detects, embedded in the second data-bit sequence, the first framing-bit sequence. The detecting means also detects the errors in the second data-bit sequence. The errors were caused by the second framing-bit sequence, for each bit for which it was substituted on the encoded-bit sequence. Thus, the second framing-bit sequence appears as errors in the second data-bit sequence. In response to detecting, in the second data-bit sequence, the first framing-bit sequence and the errors from the second framing-bit sequence, the detecting means generates an alignment signal. The alignment signal is sent through the communications channel to the aligning means which is located between the generating means and encoding means. The alignment signal may be encoded by the second encoding/decoding means, and decoded by first encoding/decoding means. In response to receiving the alignment signal, the aligning means shifts the framing-bit sequence until the detected errors and detected first framing-bit sequence are aligned at the detecting means. Accordingly, errors appear in the second data-bit sequence only at the locations of the first framing-bit sequence.

The present invention also includes a method using a dual-framing-bit-alignment apparatus for aligning a first framing-bit sequence embedded in a first data-bit sequence with a second framing-bit sequence embedded in an encoded-bit sequence. The encoded-bit sequence may be an encrypted-bit sequence. The method comprises the steps of decoding the encoded-bit sequence as a second data-bit sequence; detecting the first framing-bit sequence embedded in the second data-bit sequence; detecting errors in the second data-bit sequence due to the decoded framing-bit sequence; generating, responsive to the detected first framing-bit sequence and the detected errors, and alignment signal; and, aligning the first framing-bit sequence in the first data-bit sequence with the detected errors in the second data-bit sequence.

Additional objects and advantages of the invention will be set forth in part in the description which follows, and in part will be obvious from the description, or may be learned by practice of the invention. The objects and advantages of the invention also may be realized and obtained by means of the instrumentalities and combinations particularly pointed out in the appended claims.

BRIEF DESCRIPTION OF THE DRAWINGS

The accompanying drawings, which are incorporated in and constitute a part of this specification, illustrate particular embodiments of the invention, and together with the description, service to explain the principles of the invention.

DETAILED DESCRIPTION OF THE PREFERRED EMBODIMENTS

Reference will now be made in detail to the present preferred embodiments of the invention, examples of which are illustrated in the accompanying drawings, wherein like reference numerals indicate like elements throughout the several views.

Figure 2:
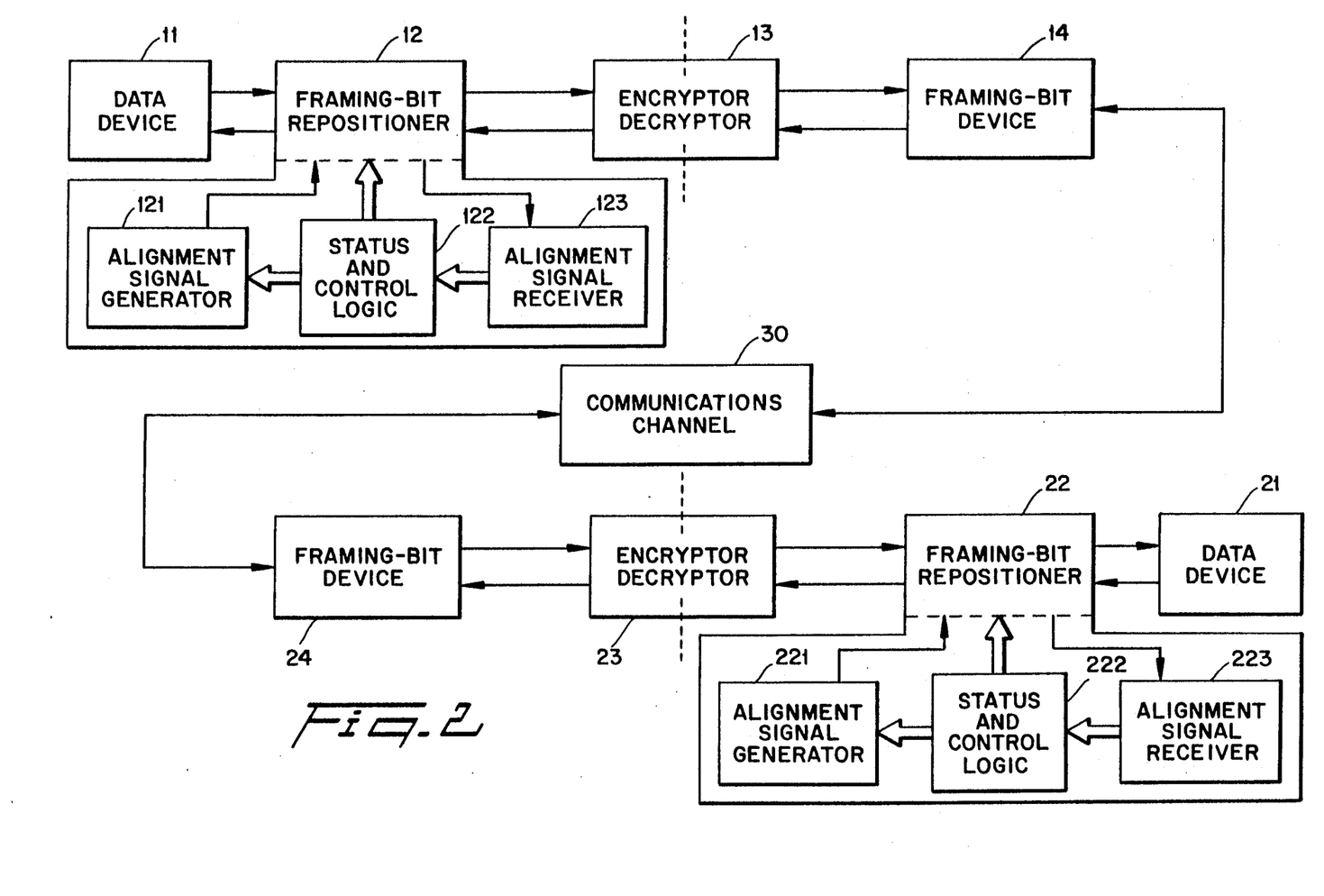
FIG. 2 is a block diagrammatic view of an embodiment of a dual-framing-bit-alignment apparatus according to the present invention.

Referring to FIG. 2, a preferred embodiment of a dual-framing-bit-alignment apparatus is shown comprising a communications channel 30, generating means, first encoding/decoding means, substituting means, second encoding/decoding means, detecting means, and aligning means. The generating means is coupled to the encoding means, and the first encoding/decoding means is coupled to the communications channel. The second encoding/decoding means is coupled to the communications channel, and the detecting means is coupled to the second encoding/decoding means. The aligning means is coupled between the generating means and the first encoding/decoding means.

In the exemplary arrangement shown, generating means may be embodied as a data device 11, first encoding/decoding means may be embodied as an encryptor/decryptor 13, aligning means may be embodied as first framing-bit repositioner 12, substituting means may be embodies as framing-bit device 14 or framing-bit device 24, the second encoding/decoding means may be embodied as a decryptor 23, and the detecting means may be embodied as second framing-bit repositioner 22. The first framing-bit repositioner 12 can further include an alignment signal receiver 123, status and control logic 122 and an alignment signal generator 121. The second framing bit repositioner includes an alignment signal receiver 223, status and control logic 222 and an alignment signal generator 221.

Encoding means, as used herein, includes any device which encodes or transforms the first data-bit sequence to an encoded bit sequence or equivalent. The equivalent of an encoded bit sequence includes any encoded or encrypted version of the first data-bit sequence employing the concepts taught herein.

Decoding means, as used herein, includes any device which decodes or transforms the framed-encoded-bit sequence or equivalent to the second data-bit sequence. The equivalent of a framed-encoded-bit sequence includes any framed encrypted, transformed, or scrambled version of the first data-bit sequence employing the concepts taught herein.

A preferred embodiment, as illustratively shown in FIG. 2, uses the data device 11 for generating a first data-bit sequence have a first framing-bit sequence. The first framing-bit sequence might be, for example, an alternating sequence of 1-bits and 0bits located in the 193rd-bit position as found in the T1 network. The first framing-bit repositioner 12, which is coupled to the data device 11, may be used for aligning the first framing-bit sequence with a second framing-bit sequence. The first encryptor/decryptor 13 is coupled to the first framing-bit repositioner 12 and encrypts the first data-bit sequence as an encrypted-bit sequence. The framing-bit device 14 substitutes a second framing-bit sequence onto the encrypted-bit sequence thereby generating a framed-encrypted-bit sequence, and transmits the framed-encrypted-bit sequence over the communications channel 30. The framing-bit device 14 may be embodied as a channel service unit (CSU).

The second encryptor/decryptor 23 is coupled to the communications channel 30, and decrypts the framed-encrypted-bit sequence as a second data-bit sequence. A second framing-bit repositioner 22 is coupled to the second encryptor/decryptor 23. The second framing-bit repositioner 22 using status and control logic 222 detects the first framing-bit sequence embedded in the second data-bit sequence. The second framing-bit repositioner 22 also detects errors in the second data-bit sequence which are due to the second framing-bit sequence which was substituted on the encrypted-bit sequence with framing-bit device 14. In response to the detected first framing-bit sequence and the detected errors, the second framing-bit repositioner 22 using alignment signal generator 221 generates an alignment signal which is sent to first framing bit repositioner 12. In a preferred embodiment, the alignment signal is sent through second encryptor/decryptor 23, framing-bit device 24, communications channel 30, framing-bit device 14, first encryptor/decryptor 13 to first framing-bit positioner 12. The alignment signal alternatively may be sent through a non-encrypted channel.

In response to receiving the alignment signal with alignment signal receiver 123, the first framing-bit repositioner 12 aligns the first framing-bit sequence so that in the second data-bit sequence, the first framing-bit sequence is in the same position as the detected errors.

The first framing-bit repositioner 12, using status and control logic 122, may reposition the first framing-bit sequence in the first data-bit sequence, to any desired bit location in response to the alignment signal.

The present invention may further include a second data device 21 and a second framing-bit device 24, for performing the same cooperative functions and operation as the first framing-bit device 14 and the first data device 11 for transmitting data in the reverse direction.

In operation, the first data device 11 generates a first data-bit sequence which is transmitted through the first framing-bit repositioner 12 and which may be buffered in registers or other device for purposes of delaying the first framing-bit sequence. The first data-bit sequence includes the first framing-bit sequence as required for a communications network, such as the T1 network. The first data-bit sequence then passes to the first encryptor/decryptor 13 and is encrypted as an encrypted-bit sequence. The encrypted-bit sequence passes to the first framing-bit device 14 wherein the second framing-bit sequence is substituted onto the encrypted-bit sequence thereby generating a framed-encrypted-bit sequence. The substitution of the second framing-bit sequence onto the encrypted-bit sequence will cause errors when the framed-encrypted-bit sequence is decrypted. An assumption for the present invention is that the first encryptor/decryptor 13 used with this invention employs stream encipherment, not block encipherment, thus one bit error may result for each one bit substituted by the first framing-bit device 14. The framed-encrypted-bit sequence, which includes the substituted second framing-bit sequence, is passed over communications channel 30.

The second encryptor/decryptor 23 decrypts the framed-encrypted-bit sequence to a second data-bit sequence. The second data-bit sequence at this point includes errors in the bit locations where the second framing-bit sequence was substituted onto the encrypted-bit sequence.

The second framing-bit repositioner bit 22 detects the errors in the second data-bit sequence which are due to the second framing-bit sequence. The second framing-bit repositioner 22 also detects the original first framing-bit sequence in the second data-bit sequence, which was included with the first data-bit sequence generated by data device 11. Assuming that the errors in the second data-bit sequence and the first framing-bit sequence have different bit locations, then the second framing-bit repositioner 22 using alignment signal generator 221 generates an alignment signal which is sent to the first framing-bit repositioner 12. The alignment signal indicates to the first framing-bit repositioner 12 the amount of delay as required of the first data-bit sequence, which will align the first framing-bit sequence with the second framing-bit sequence. The alignment will occur when the detected errors in the second data-bit sequence are aligned in the same positions as the first framing-bit sequence in the second data-bit sequence.

Figure 3:
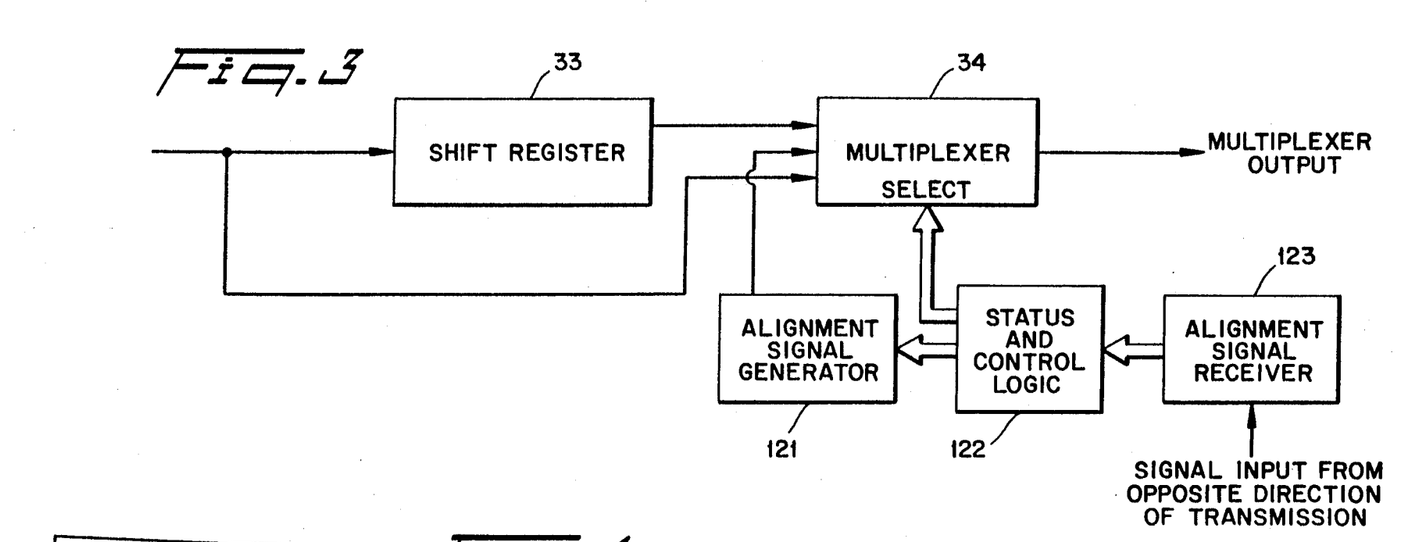
FIG. 3 is a block diagram of a framing-bit repositioner.
Figure 4:
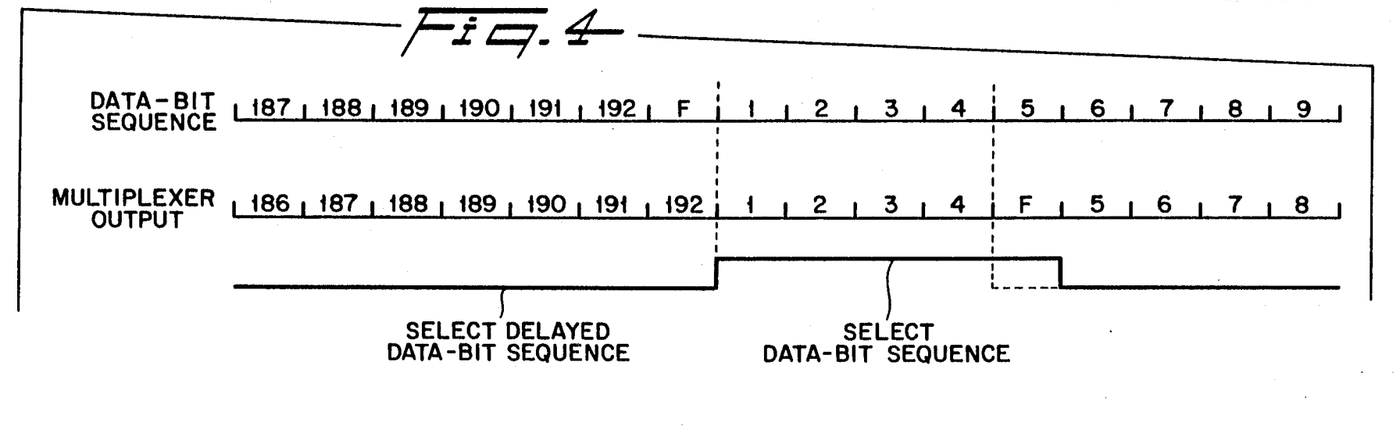
FIG. 4 illustrates the timing of the alignment signal.

The first framing-bit repositioner 12 may include a shift register 33 and multiplexer 34, as illustrated in FIG. 3. In normal operation, the first data-bit sequence passes through the shift register 33 through the multiplexer 34. Accordingly, at the output of the multiplexer 34 is a delayed data-bit sequence, as illustrated in FIG. 4. In response to the alignment signal receiver 123 receiving the alignment signal, as shown in FIG. 4, the status and control logic 122 causes the multiplexer 34 to switch the shift register 33 out of the circuit, and the data-bit sequence bypasses the shift register 33 and passes through the multiplexer 34. When the alignment signal is discontinued, the framing bit drops from the shift register 33 and the data-bit sequence passes through shift register 33 through multiplexer 34. Accordingly, the framing bit relocates, as indicated in FIG. 4 from between bit locations 192 and 1 to between bit locations 4 and 5.

The first framing-bit repositioner 12 may relocate the bit locations of the first framing-bit sequence to a different bit position in the first data-bit sequence. In this case, an interceptor of the framed-encrypted-bit sequence will not have knowledge of where the first framing-bit sequence was in the first data-bit sequence. This relocation denies the crypto-analyst side information of location or bit position of the first framing-bit sequence.

The present invention further includes a method using a dual-framing-bit-alignment apparatus for aligning a first framing-bit sequence embedded in a first data-bit sequence with a second framing-bit sequence embedded in an encoded-bit sequence The encoded-bit sequence may be an encrypted-bit sequence. The method comprises the steps of decoding the encoded-bit sequence as a second data-bit sequence; detecting the first framing-bit sequence embedded in the second data-bit sequence; detecting errors in the second data-bit sequence; generating, responsive to the detected first framing-bit sequence and the detected errors, an alignment signal; and aligning the first framing-bit sequence in the first data-bit sequence with the detected errors in the second data-bit sequence.

The method may additionally include the steps of repositioning the first framing-bit sequence in the first data-bit sequence so that knowledge of the location of the first framing-bit sequence in the first data-bit sequence is not determined by an interceptor of the framed-encrypted-bit sequence which has the second framing-bit sequence substituted thereon.

The second framing-bit repositioner of the present invention may have a shift register which can delay or substitute the framing-bit sequence in any of the bit slots from 0 to 192 bits, for example, for the T1 network. The dual-framing-bit-alignment apparatus adjusts the length of the delay such that at the output of the second framing-bit repositioner, the first framing-bit sequence is positioned where the second framing-bit sequence has been written over the encrypted-bit sequence.

The present invention has an advantage where there is a first framing-bit sequence in a first data-bit sequence, the first framing-bit sequence can be preserved when the first data-bit sequence is encrypted for transmission over a communications channel. At the same time, there is no physical device connecting the encryption channel to the plaintext channel by bypassing the encryptor or decryptor.

Errors can be detected in the second data-bit sequence which are due to the second framing-bit sequence, by employing error detection schemes such as cyclic redundancy codes with the first data-bit sequence. Thus, when the first data-bit sequence passes through the encryptor to the decryptor as a second data-bit sequence, the errors which are due to the second framing-bit sequence which was substituted on the encrypted-bit sequence can be detected. Additionally, the proper error correcting code and detecting scheme can be used to tell the distance from the actual detected first framing-bit sequence detected in the second data-bit sequence, and the detected errors in the second data-bit reference.

The Framing Bit Repositioners 12, 22 require end-to-end communications of certain information, both when in the normal, properly aligned, condition, and also when in an alarmed or mis-aligned condition.

The signal sent to communicate the information is known as "IVAN Code". IVAN Code is sent in the D4 frame bit positions in such a manner that it can always be received by the framing-bit repositioner 23 at the far end, no matter where the ESP CSU "stomps".

Since the ESF CSU stomps only in the "C" (CRC) and "F" (frame alignment) positions, the "M" (data link) positions are transparent end-to-end. If the 193rd bit position, B193, of the near end framing-bit repositioner 12 were properly aligned with the ESF CSU B193, then either the D4, Ft or the D4, Fs bit positions are transparent end-to-end and the alternate B193 is randomly errored. Because of this, there are actually two separate, almost identical IVAN Codes: IVAN-T (IVT), and IVAN-S (IVS) sent in the Ft and Fs bit positions, respectively.

If the near end framing-bit repositioned 12 were properly aligned with the ESF CSU, then either IVT or IVS is received at the far end framing-bit repositioner 22, but not both. If the framing-bit repositioner 12, 22 were improperly aligned, then both IVT and IVS is received at the far end framing-bit repositioner 22, and one of the traffic bits is randomly errored.

The purpose of IVAN Code is as follows:
1. Provide a frame pattern for which the far end framing-bit repositioner 22 can search, and lock-up to, which also provides superframe alignment corresponding to the original D4 superframe.
2. Provide an indication of receive alignment (normal) or mis-aligned (alarmed) to the far end framing-bit repositioner 22.
3. Provide an "offset" value between 0 and 192 (8 bits) to tell the far end framing-bit repositioner 22 where to restore the frame pattern (normal mode).
4. Provide a different offset value between 0 and 192 (8 bits) to tell the far end framing-bit repositioner 22 how much to change its alignment (alarm mode).

IVAN Code (either IVT or IVS) is a 24 bit sequence having two interleaved patterns. The first pattern contains 6 "zeros" and 6 "ones":

0 0 0 0 0 0 1 1 1 1 1 1

This bit corresponds to a D4 superframe position. The second pattern is as follows:

```
1  0  1  |  X X X X X X X X  |  P
 Spoiler    —8 Bit Offset—      Phase
```

The combined pattern then is:

```
0 0 0 0 0 0 1 1 1 1 1 1
1 0 1 X X X X X X X X P
```
0100010X0X0X1X1X1X1X1X1P

Figure 5:
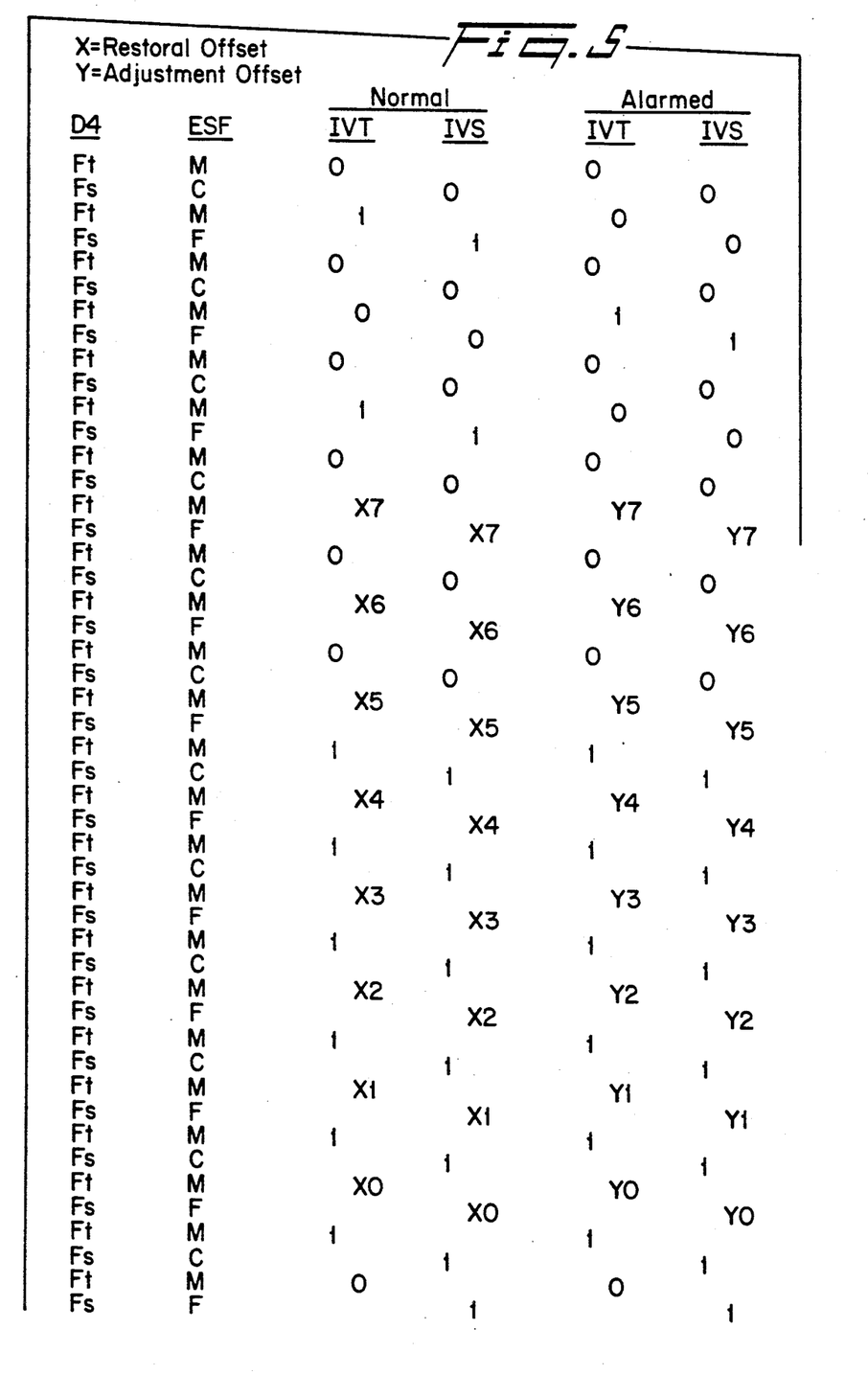
FIG. 5 shows the relationships between D4, Ft and Fs bits and the corresponding IVAN code patterns.

FIG. 5 illustrates the relationship between D4, Ft and Fs bits and the corresponding IVAN Code patterns.

The "phase bit" is set to a "zero" for IVT and to a "one" for IVS. This is the only difference between IVT and IVS.

The "Spoiler" bits, first three bits of the second pattern, prevent the second pattern from ever accidentally emulating the superframe pattern, regardless of what the offset data might be. The Spoiler bits are as shown (101) to indicate normal condition and are inverted (010) to indicate alarmed, misaligned, condition. Both the normal or inverted spoiler patterns act as spoilers.

The 8 offset value bits carry two different offsets:
1. In the normal, aligned, mode, the 8 bits carry the sending end offset. The framing-bit repositioner at the receiving end receives this value and subtracts it from B192. The result is used to restore a properly aligned D4 pattern in the original bit position. FIG. 5 refers to these bits as X7–X0.
2. In the alarm, mis-aligned mode, the same 8 bits carry the measured offset, at the framing-bit repositioner at the receiving end, between the random error position and the IVAN Code position to tell the sending end how many bits by which to re-align. FIG. 5 refers to these bits as Y7–Y0.

Note that either offset value, X or Y, may be in the range of 0 to 192. Therefore, there are 256−193=63 codes which never appear in normal operation. Future enhancements may utilize some of those values.

The "phase" bit is required for purposes of restoring the original frame bit position at the receiving (decode) end. As described above, either IVT or IVS, but not both is received in a properly aligned system and which on cannot be pre-determined.

Since the first bit of IVT corresponds with the first bit of a D4 superframe pattern, and the first bit of IVS corresponds to the second bit of a D4 superframe, one must know which IVAN Code the framing-bit repositioner is receiving in order to properly generate a replacement D4 superframe pattern. The "phase" bit gives that information. It will be apparent to those skilled in the art that various modifications can be made to the dual-framing-bit-alignment apparatus of the instant invention without departing from the scope or spirit of the invention, and it is intended that the present invention cover modifications and variations of the dual-framing-bit-alignment apparatus provided they come within the scope of the appended claims and their equivalents.

I claim:

1. A dual-framing-bit-alignment apparatus comprising:
 a communications channel;
 means for generating a first data-bit sequence having a first framing-bit sequence;
 an encryptor coupled to said generating means for encrypting the first data-bit sequence as an encrypted-bit sequence;
 means coupled to said encryptor for substituting a second framing-bit sequence onto the encrypted-bit sequence to generate a framed-encrypted-bit sequence and transmitting the framed-encrypted-bit sequence with the second framing-bit over said communications channel;
 a decryptor coupled to said communications channel for decrypting the framed-encrypted-bit sequence as a second data-bit sequence;
 means coupled to said decryptor for detecting the first framing-bit sequence embedded in the second data-bit sequence, for detecting errors in the second data-bit sequence due to the second framing-bit sequence being substituted on the encrypted-bit sequence, and responsive to the detected first framing-bit sequence and detected errors for generating an alignment signal; and means coupled through said encryptor, said communications channel and said decryptor, to said detecting means, and responsive to the alignment signal for aligning the detected errors with the first framing-bit sequence in the first data-bit sequence.

2. A dual-framing-bit-alignment apparatus comprising:

means for generating a first data-bit sequence having a first framing-bit sequence;

first means for transforming the first data-bit sequence to an encoded-bit sequence;

means for substituting a second framing-bit sequence onto the encoded-bit sequence to generate a framed-encoded-bit sequence;

second means for transforming the framed-encoded-bit sequence to a second data-bit sequence;

means for detecting the first framing-bit sequence embedded in the second data-bit sequence, for detecting errors in the second data-bit sequence due to the second framing-bit sequence, and for generating an alignment signal; and means responsive to the alignment signal for aligning the detected errors with the first framing-bit sequence.

3. The dual-framing-bit-alignment apparatus as set forth in claim 2 wherein said first and second transforming means include an encryptor and a decryptor, respectively, and the encoded-bit sequence and framed-encoded-bit sequence include an encrypted-bit sequence and framed-encrypted-bit sequence, respectively.

4. A dual-framing-bit-alignment apparatus for aligning a first framing-bit sequence embedded in a first data-bit sequence with a second framing-bit sequence embedded in an framed-encoded-bit sequence, comprising:

means for transforming the framed-encoded-bit sequence to a second data-bit sequence;

means coupled to said transforming means and responsive to the second data-bit sequence for detecting the first framing-bit sequence embedded in the second data-bit sequence, for detecting errors in the second data-bit sequence due to the transformed second framing-bit sequence, and for generating, responsive to the first framing-bit sequence and the detected errors, an alignment signal; and means coupled to said detecting means and responsive to the alignment signal for aligning the first framing-bit sequence in the first data-bit sequence with the detected errors in the second data-bit sequence.

5. The dual-framing-bit-alignment apparatus as set forth in claim 4 wherein said transforming means includes a decryptor, and the framed-encoded-bit sequence includes a framed-encrypted-bit sequence.

6. A dual-framing-bit-alignment apparatus for aligning a first framing-bit sequence embedded in a first data-bit sequence with a second framing-bit sequence embedded in a framed-encoded-bit sequence, comprising:

means for transforming the framed-encoded-bit sequence to a second data-bit sequence;

means for detecting the first framing-bit sequence embedded in the second data-bit sequence;

means for detecting errors in the second data-bit sequence due to the transformed second framing-bit sequence, and for generating, responsive to the detected first framing-bit sequence and the detected errors, an alignment signal; and means responsive to the alignment signal for aligning the first framing-bit sequence in the first data-bit sequence with the detected errors in the second data-bit sequence.

7. The dual-framing-bit-alignment apparatus as set forth in claim 6 wherein said transforming means includes a decryptor, and the framed-encoded-bit sequence includes an framed-encrypted-bit sequence.

8. The dual-framing-bit-alignment apparatus as set forth in claim 1 further including means for repositioning the first framing-bit sequence in the first data-bit sequence, prior to encrypting the first data-bit sequence.

9. The dual-framing-bit-alignment apparatus as set forth in claim 2 further including means for repositioning the first framing-bit sequence in the first data-bit sequence, prior to transforming the first data-bit sequence.

10. The dual-framing-bit-alignment apparatus as set forth in claim 3 further including means for repositioning the first framing-bit sequence in the first data-bit sequence, prior to transforming the first data-bit sequence.

11. A dual-framing-bit-alignment apparatus for aligning a first framing-bit sequence embedded in a first data-bit sequence with a second framing-bit sequence embedded in a framed-encrypted-bit sequence, comprising:

a decryptor for decrypting the framed-encrypted-bit sequence to a second data-bit sequence;

means for detecting the first framing-bit sequence embedded in the second data-bit sequence;

means for detecting errors in the second data-bit sequence due to the decrypted second framing-bit sequence, and for generating an alignment signal; and means responsive to the alignment signal for aligning the first framing-bit sequence in the first data-bit sequence with the detected errors in the second data-bit sequence.

12. A method using a dual-framing-bit-alignment apparatus for aligning a first framing-bit sequence embedded in a first data-bit sequence with a second framing-bit sequence embedded in an framed-encoded-bit sequence, comprising the steps of:

decoding the framed-encoded-bit sequence as a second data-bit sequence;

detecting the first framing-bit sequence embedded in the second data-bit sequence;

detecting errors in the second data-bit sequence due to the decoded second framing-bit sequence;

generating, responsive to the detected first framing-bit sequence and the detected errors, an alignment signal; and aligning the first framing-bit sequence in the first data-bit sequence with the detected errors in the second data-bit sequence.

13. A method using a dual-framing-bit-alignment apparatus comprising the steps of:

generating a first data-bit sequence having a first framing-bit sequence;

encrypting the first data-bit sequence as an encrypted-bit sequence;

substituting a second framing bit sequence onto the encrypted-bit sequence to generate a framed-encrypted-bit sequence;

transmitting the framed-encrypted-bit sequence with the second framing-bit sequence over said communications channel;

decrypting the framed-encrypted-bit sequence as a second data-bit sequence;

detecting the first framing-bit sequence embedded in the second data-bit sequence;

detecting errors in the second data-bit sequence due to the second framing-bit sequence;

generating an alignment signal; and aligning the detected errors with the first framing-bit sequence in the first data-bit sequence.

14. A method using a dual-framing-bit-alignment apparatus comprising the steps of:

generating a first data-bit sequence having a first framing-bit sequence;

encoding the first data-bit sequence as an encoded-bit sequence;

substituting a second framing-bit sequence onto the encoded-bit sequence to generated a framed-encoded-bit sequence;

decoding the framed-encoded-bit sequence as a second data-bit sequence;

detecting the first framing-bit sequence embedded in the second data-bit sequence;

detecting errors in the second data-bit sequence due to the second framing-bit sequence;

generating an alignment signal; and aligning the detected errors with the first framing-bit sequence.

15. A method using a dual-framing-bit-alignment apparatus for aligning a first framing-bit sequence embedded in a first data-bit sequence with a second framing-bit sequence embedded in a framed-encoded-bit sequence, comprising the steps of:

decoding the framed-encoded-bit sequence as a second data-bit sequence;

detecting the first framing-bit sequence embedded in the second data-bit sequence;

detecting errors in the second data-bit sequence due to the decoded second framing-bit sequence;

generating, responsive to the first framing-bit sequence and the detected errors, an alignment signal; and aligning the first framing-bit sequence in the first data-bit sequence with the detected errors in the second data-bit sequence.

16. A method using a dual-framing-bit-alignment apparatus for aligning a first framing-bit sequence embedded in a first data-bit sequence with a second framing-bit sequence embedded in an encoded bit sequence, comprising the steps of:

decoding the encoded bit sequence as a second data-bit sequence;

detecting the first framing-bit sequence embedded in the second data-bit sequence;

detecting errors in the second data-bit sequence due to the decoded second framing-bit sequence; and aligning the first framing-bit sequence in the first data-bit sequence with the detected errors in the second data-bit sequence.

17. A dual-framing-bit-alignment apparatus comprising:

a data device for generating a first data-bit sequence having a first framing-bit sequence;

an encoder for transforming the first data-bit sequence to an encoded-bit sequence;

a framing-bit device for substituting a second framing-bit sequence onto the encoded-bit sequence to generate a framed-encoded-bit sequence;

a decoder for transforming the framed-encoded-bit sequence to a second data-bit sequence;

a second framing-bit repositioner for detecting the first framing-bit sequence embedded in the second data-bit sequence, for detecting errors in the second data-bit sequence due to the second framing-bit sequence, and for generating an alignment signal; and a first framing-bit repositioner responsive to the alignment signal for aligning the detected errors with the first framing-bit sequence.

18. The dual-framing-bit-alignment apparatus as set forth in claim 17 wherein said encoder and said decoder include an encryptor ad a decryptor, respectively, and the encoded-bit sequence and framed-encoded-bit sequence include an encrypted-bit sequence and framed-encrypted-bit sequence, respectively.

19. A dual-framing-bit-alignment apparatus for aligning a first framing-bit sequence embedded in a first data-bit sequence with a second framing-bit sequence embedded in an framed-encoded-bit sequence, comprising:

an decoder for transforming the framed-encoded-bit sequence to a second data-bit sequence;

a second framing-bit repositioner coupled to said decoder and responsive to the second data-bit sequence for detecting the first framing-bit sequence embedded in the second data-bit sequence, for detecting errors in the second data-bit sequence due to the transformed second framing-bit sequence, and for generating, responsive to the first framing-bit sequence and the detected errors, an alignment signal; and a first framing-bit repositioner coupled to said second framing-bit repositioner and responsive to the alignment signal for aligning the first framing-bit sequence in the first data-bit sequence with the detected errors in the second data-bit sequence.

20. The dual-framing-bit-alignment apparatus as set forth in claim 19 wherein said decoder includes a decryptor, and the framed-encoded-bit sequence includes a framed-encrypted-bit sequence.

* * * * *